Nov. 6, 1923.
A. W. KNUTSON
1,473,298
ATTACHMENT FOR TRACTORS AND MOTOR VEHICLES
Filed July 23, 1921
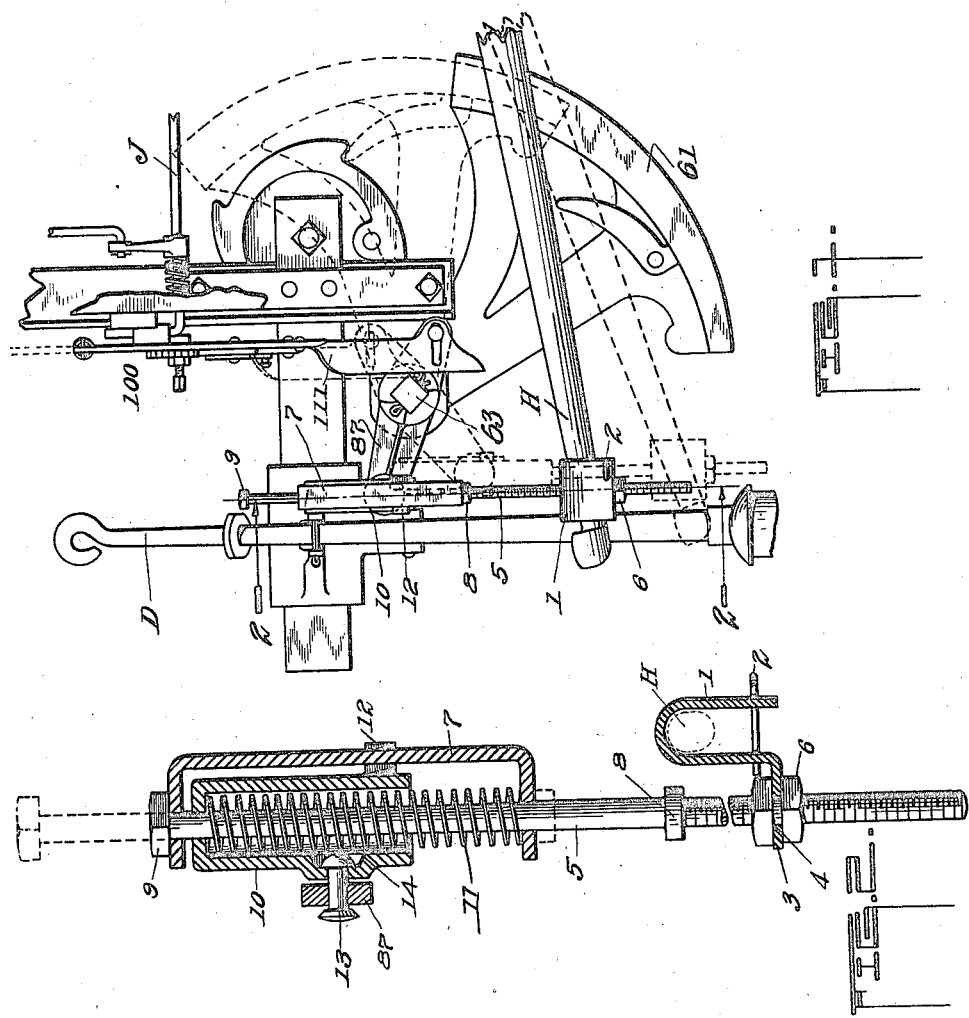
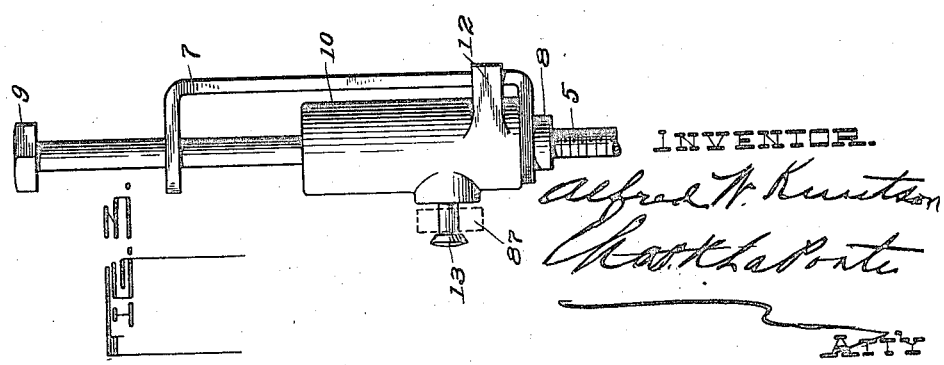
INVENTOR.
Alfred W. Knutson
Atty Patented Nov. 6, 1923.

1,473,298

UNITED STATES PATENT OFFICE.

ALFRED W. KNUTSON, OF GALESBURG, ILLINOIS, ASSIGNOR TO ALVIN V. ROWE, OF GALESBURG, ILLINOIS.

ATTACHMENT FOR TRACTORS AND MOTOR VEHICLES.

Application filed July 23, 1921. Serial No. 486,949.

*To all whom it may concern:*

Be it known that I, ALFRED W. KNUTSON, a citizen of the United States, a resident of Galesburg, in the county of Knox and State of Illinois, have invented new and useful Improvements in Attachments for Tractors and Motor Vehicles, of which the following is a specification.

This invention has reference to an attachment for tractors and motor vehicles, and particularly to such as may be provided with a rein or line control, as supplemental to the usual and ordinary controlling means therefor.

The invention has for its principal object to improve the attachment disclosed in my application (C) filed November 20th, 1920, bearing Serial No. 425,462, which is closely associated with and a companion to applications (A) and (B) bearing Serial Nos. 425,460 and 425,461 respectively.

The object, as stated in application bearing Serial No. 425,462, is to provide a self contained attachment, which is formed for bodily securement, to a tractor or like vehicle, and which includes rein or line control means for the fuel feed regulating device; such control being capable of advancing such fuel feed as may be required when the gear shifting has been accomplished to set the tractor in motion, and from time to time as may be needed when the tractor is under heavy load, such for instance as when taking an incline or meeting unusual obstacles, and for retarding the fuel feed when ground conditions are normal and when slowing the tractor down and stopping.

While the present attachment is applicable to the clutch lever of a tractor of the type of the "Fordson," and under the control of the operator or attendant through the provision of reins or lines, in addition to permitting freedom of use of said lever in the ordinary manner, by foot operation; it is to be understood that the present attachment may be found equally as applicable to other and different makes of tractors where a fuel feed regulating device may be used.

That the invention may be more fully understood, reference is had to the accompanying drawings forming a part of the present description, illustrating a preferred embodiment of the invention, in which:—

Fig. 1 is a detail side elevation of so much of an attachment, as is necessary to illustrate the within invention;

Fig. 2 is a detail sectional view as the same would appear on the line 2—2 of Fig. 1, except that the position of parts has been changed, and Fig. 3 is a detail elevation of parts seen in Fig. 2.

Like characters of reference denote corresponding parts throughout the figures.

For the purposes of this disclosure the gear shifting lever is designated D, the clutch lever is designated H, and 100 designates generally the fuel feed regulator controlling means including the operating rod J controlled through and by means of a lever arm, not shown, at the steering wheel of the tractor. I am not here concerned with the detail construction of the component elements of the fuel feed regulator controlling means, as that disclosed in application bearing Serial No. 425,462 will suffice, or the same may be some other or modified construction, except that an arm or bar 111 or its equivalent is the instrumentality through which motion is imparted from my attachment to the operative parts constituting such fuel feed regulator controlling means.

In my attachment and in my application bearing Serial No. 425,462 a cross-shaft 63 is employed arranged to be operated by a segment 61 from and by means of reins or lines, not shown, and a connection is made between the shaft 63 and the arm or bar 111, by means of a double ended crank arm 87 connected to one end of said shaft 63.

Referring now to the attachment connection between the clutch lever H and the shaft 63, 1 denotes an inverted U shaped clamp which is dropped down over the clutch lever and same preferably held by a cotter pin 2 or some other suitable means. Said clamp is provided with an angle plate 3 having an opening 4 therein, through which is passed the stem or rod 5 threaded at its lower end and for a portion of its length to receive lock nuts 6 to adjustably connect the clamp 1 thereto in the manner best seen in Fig. 2. The stem or rod 5 passes up through what I prefer to term a housing 7 and at 8 said stem or rod is formed or has connected thereto a flange 8 and on its upper end is formed with or has connected thereto a head 9. Normally the flange 8 is located immediately under or in juxtaposition to the lower end of the housing 7, best seen in Figs. 1 and 3, with the head 9 of the stem or rod 5 removed somewhat above the upper end of said housing 7.

On the stem or rod 5 and within the housing 7 is arranged an inverted barrel-like casting 10. Within said barrel-like casting and on said rod or stem 5 is carried a coil spring 11 which bears against the inside of the lower end of the housing 7 and against the inside of the upper end of said barrel-like casting, see Fig. 2. This spring normally holds the barrel-like casting at the upper end of the housing 7, as seen in Fig. 2, and said barrel-like casting is preferably held against oscillatory motion by means of the guide fingers 12 connected thereto and located on opposite sides of said housing 7, as best seen in Figs. 2 and 3.

The double ended crank arm 87 which is connected to one end of the shaft 63, as shown in Fig. 1, has one end pivotally connected with the slotted lower end of the arm or bar 111, while the opposite end of said crank arm is pivotally connected to said barrel-like casting 10 somewhat in the manner shown in Fig. 2; that is to say, said crank arm has a connection with said barrel-like casting through and by means of a pivot pin 13, the inner head of which is fitted in a socket 14 in the barrel-like casting so that there may be some play between the crank arm 87 and said casting to provide for irregular castings and crudeness in assemblage of the elements, or parts of the device so as not to cramp the movement of the barrel-like casting when the crank arm 87 is actuated through the shaft 63 to reciprocate said barrel-like casting within and independently of the housing 7 and with said housing.

In operation, assuming that a tractor is equipped with the fuel feed regulator controlling means shown and described in my application bearing Serial No. 425,462, or some other similar or equivalent means and it is desired to actuate the same in the usual and ordinary manner provided on tractors, and not by rein or line control means, when the operator or attendant depresses the clutch lever H it may oscillate and pull down with it, the stem or rod 5 which will move from the dotted line position in Fig. 2 to the full line position therein shown in said figure, without operating the parts of the attachment other than the clamp 1 connected to said clutch lever. This construction of the stem or rod 5 and its relation to the housing 7 so that it will be reciprocated therein without movement of the barrel-like casting 10, will, as understood, allow the clutch lever H to be actuated by the foot in the ordinary and usual manner.

Assuming that the rein or line means employed on the tractor is actuated to operate the segment 61 and the shaft 63 to reciprocate the bar or arm 111 for imparting movement to the fuel feed regulator controlling means for the purpose of advancing or retarding the gas, the slight oscillation imparted to the crank arm 87 will depress the barrel-like casting 10 within the housing 7, against the tension of the spring 11, said spring, with each actuation of the shaft 63, returning the barrel-like casting 10 and the crank arm 87 to a position similar to that shown in Fig. 1, and such operation in no way affects the operation of the clutch lever H, as will be understood. Now, when the actuation of the fuel feed regulator controlling means slightly precedes that of the clutch lever H, and when a long pull is made upon the rein or lines to operate the shaft 63 to the limit of its movement, the reciprocation of the barrel-like casting 10 through the oscillation of the crank arm 87 will force said barrel-like casting 10 into engagement with the lower end of the housing 7 and it bearing against the flange 8 of the rod or stem 5 will reciprocate the latter, and it being connected with the clamp 1, will as will be understood, reciprocate the clutch lever H, moving it from the position shown in full lines in Fig. 1 to the dotted line position in said figure. It is understood that the fuel feed regulator controlling means may be actuated to retard or advance the gas at all times without actuating the clutch and that a full actuation of the shaft 63, which will carry the barrel-like casting 10 through to the limit of its reciprocal movement, will also impart movement to the clutch lever H for the purposes usual in devices of this character and substantially in the manner and for the purposes described, by the attachment in the application above referred to, bearing Serial No. 425,462, of which the herein described attachment is an improvement.

It is to be noted that the tension in the spring 11 is considerably less than the tension in the spring, not shown, associated in the usual manner with the clutch lever H, and therefore, while the barrel-like casting 10 may be depressed or moved downwardly a limited distance against the tension of said spring 11, and be returned by such spring to its uppermost position, the clutch lever is not disturbed, and not until the casting 10 abuts with the lower end of the housing 7 and the pressure on the casting is continued, is there any movement downward of the clutch lever.

What I claim is:—

1. In an attachment for tractors or the like, in combination with the foot operated clutch lever, a shaft in operative connection with the fuel feed control, and an operating connection between said shaft and said lever, such connection including means permitting a predetermined oscillation of said shaft without imparting movement to said lever, and also permitting freedom of movement of said lever without actuation of such operating connections.

2. In an attachment for tractors or the like, in combination with the foot operated clutch lever, a shaft in operative connection with the fuel feed control, and a connection between said shaft and said lever including a spring, the tension of which is less than the tension in the spring of the clutch lever, whereby said shaft may have a limited oscillatory movement before movement is imparted to said lever such connection also permitting freedom of movement of said lever without actuation of the connection.

3. In an attachment for tractors or the like, in combination with the foot operated clutch lever, a shaft in operative connection with the fuel feed control, a crank on one end of said shaft, an element having a connection with said lever, and an operating connection between said crank and said element.

4. In an attachment for tractors or the like, in combination with the foot operated clutch lever, a shaft in operative connection with the fuel feed control, a crank on one end of said shaft, an element having a connection with said lever, and a yielding connection between said crank and said element.

5. In an attachment for tractors or the like, in combination with the foot operated clutch lever, a shaft in operative connection with the fuel feed control, a crank on one end of said shaft, a member connected in an upstanding position on said lever, and a connection between said crank and said member, such connection being such that the lever may be oscillated without disturbing said connection, and also such that said shaft may have a predetermined oscillation imparted thereto before movement is imparted to said lever.

6. In an attachment for tractors or the like, in combination with the foot operated clutch lever, a shaft in operative connection with the fuel feed control, and an operating connection between said shaft and said lever, such connection permitting the lever to be depressed without disturbing such connection, and also permitting a predetermined oscillation of said shaft before movement is imparted to said lever.

7. In an attachment for tractors or the like, in combination with the foot operated clutch lever, a shaft in operative connection with the fuel feed control, a crank on one end of said shaft, a bar having a detachable connection with said lever, a member reciprocally carried on said bar, a yielding connection between said member and said bar, and means connecting said crank with said member.

8. In an attachment for tractors or the like, in combination with the foot operated clutch lever, a shaft in operative connection with fuel feed control, a crank on one end of said shaft, a bar detachably connected in an upstanding position with said lever, a housing carried on said bar and through which the bar is movable for a limited distance without disturbing said housing, a barrel-like casting on said bar within said housing, a spring on said bar within said housing and said casting for yieldingly and normally holding the latter in an upper position in said housing, and means connecting said crank with said member.

In witness whereof I have hereunto affixed my hand and seal this 15 day of July, 1921.

ALFRED W. KNUTSON.